United States Patent [19]

Quick

[11] 4,089,396
[45] May 16, 1978

[54] CLUTCHES

[75] Inventor: Donald J. Quick, Bundaberg, Australia

[73] Assignee: Massey-Ferguson Services N.V., Curacao, Netherlands Antilles

[21] Appl. No.: 721,131

[22] Filed: Sep. 7, 1976

[30] Foreign Application Priority Data

Sep. 9, 1975 United Kingdom ............... 36960/75

[51] Int. Cl.² ............................................ F16D 43/21
[52] U.S. Cl. .................................................. 192/56 F
[58] Field of Search ................. 192/56 F, 150; 173/12; 81/52.4 R

[56] References Cited

U.S. PATENT DOCUMENTS

| 3,182,777 | 5/1965 | Browning et al. | 192/56 F |
| 3,205,986 | 9/1965 | Kramer | 192/56 F |
| 3,360,087 | 12/1967 | Hilpert | 192/56 F |
| 3,419,117 | 12/1968 | Conway | 192/56 F X |
| 3,511,349 | 5/1970 | Herslovici | 192/56 F |
| 3,807,539 | 4/1974 | Reed | 192/56 F X |

Primary Examiner—Allan D. Herrmann
Attorney, Agent, or Firm—Robert L. Farris

[57] ABSTRACT

Torque limiting clutch for drive to cane chopping mechanism in sugar cane harvester. Torque is transmitted through a ball and ramp self servo device. Axial thrust generated by the self servo device is transmitted through hydraulic fluid in a piston and cylinder assembly generating hydraulic pressure proportional to the torque. A pilot operated pressure limiting valve vents the cylinder and thereby stops torque transmission when a predetermined torque is reached. Selective disengagement of the clutch is provided by a manual control valve which vents the cylinder.

9 Claims, 3 Drawing Figures

CLUTCHES

This invention relates to torque transmitting devices and in particular, though not exclusively, to such devices in the form of torque limiting clutches for use in harvesting machines such as sugar cane harvesters.

Harvesting machines are usually operated at a speed such that only a small margin of crop handling capacity exists during normal use. Accordingly, due to the inevitable variations in crop yield from place to place in a given area being harvested, it often happens that an excessive quantity of crop is fed into the machine, which causes overloading both of the crop treatment apparatus and of its drives. A further problem is that foreign bodies such as stones, pieces of wood and the like also find their way into harvesting machines with the crop, causing overload conditions in various drive mechanisms.

Some of the drive mechanisms in sugar cane harvesters operate under particularly arduous conditions. For example, in addition to the factors mentioned above, the cane chopping apparatus requires a maximum torque during each chopping action and a minimum torque between successive chopping actions, the torque peaks recurring at a fairly high frequency.

Shear pins have been used in the cane chopper drive in sugar cane harvesters, but they often shear unnecessarily and they are inconvenient to replace and for those reasons cause unacceptable delays during harvesting.

Known torque limiting clutches such as slip clutches are for one reason or another unsatisfactory for use under the conditions mentioned above. Either they generate too much heat during overload, or they are inconvenient to reset after overload, or their torque limitation is too inaccurate, or they are too expensive or insufficiently rugged and robust for use in a harvesting machine. Also, many torque limiting clutches do not provide selective interruption and re-establishment of torque transmission under manual control — which is a requirement in some harvesting machine drives.

It is an object of the invention to provide a torque transmission device offering a better compromise between the factors mentioned above.

According to the invention there is provided a torque transmission device as defined in claim 1 of the accompanying claims. Other important features of the invention are defined in the sub claims.

The provision of a thrust-generating self servo device in combination with thrust-responsive reaction means in the form, for example, of a piston and cylinder with a pressure limiting valve, enables torque to be sensed and released very conveniently.

An embodiment of the invention will now be described by way of example with reference to the accompanying drawings in which.

Figure 1:
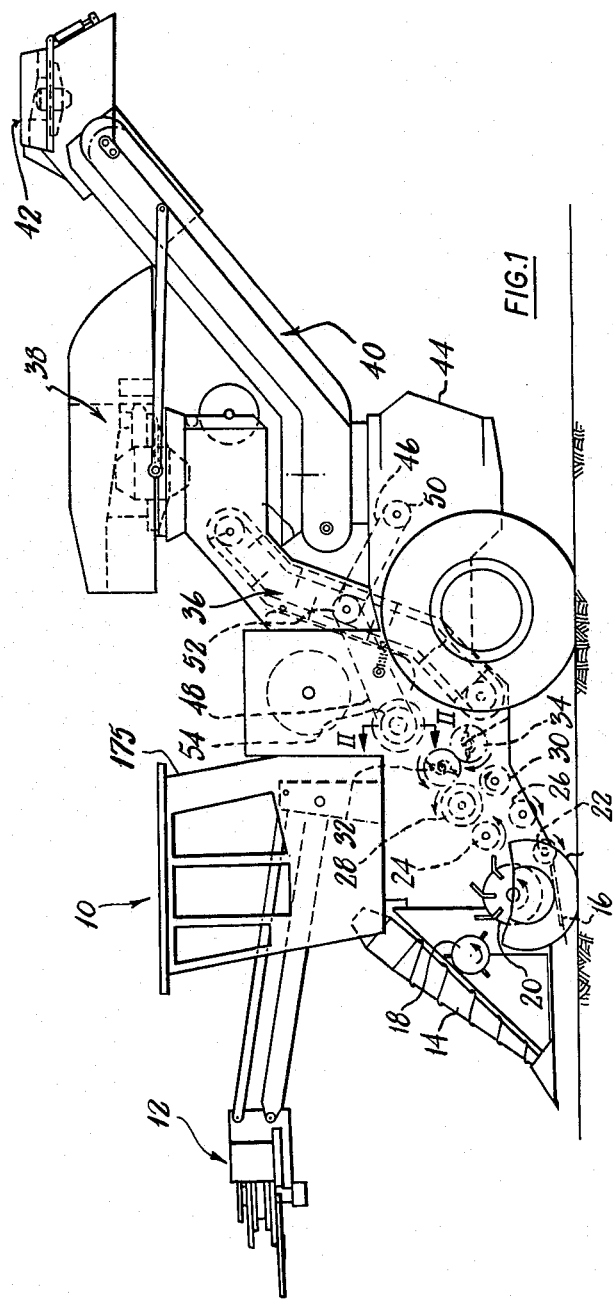
FIG. 1 shows a sugar cane harvester in side elevation with various parts of its internal structure indicated, including a drive for rotating cane chopping elements.

As shown in FIG. 1, a self propelled sugar cane harvester 10 comprises:

a topper 12 to remove cane tops;

twin rotatable crop lifting spirals 14 to raise non-upright cane sticks;

a series of power rotated rollers 18, 20, 22, 24, 26, 28, 30 to feed cane sticks rearwards through the harvester;

a pair of power-rotated in-running cane chopper drums 32, 34 driven in timed relationship and each having a pair of outwardly projecting blades, the blades being positioned to co-operate with each other to cut cane sticks into billets about 30 centimeters in length. Cane chopping apparatus of this kind is more fully described in Australian Patent No. 468,962;

a primary chain and slat elevator conveyor 36 to carry the billets upwards and rearwards;

primary trash removal apparatus 38 to remove leaves and other light material from the cane billets as they fall from the upper end of elevator 36;

a secondary chain and slat elevator conveyor 40 to carry the billets upwards and rearwards again; and secondary trash removal apparatus 42 to remove any remaining trash from the billets as they are delivered from elevator 40 to a transport vehicle (not shown).

Harvester 10 has a rear-mounted turbo-charged diesel engine located in a housing 44. Much of the power-driven equipment of the harvester is provided with individual hydraulic motors driven by a pump (not shown) connected to the engine. Chopper drums 32, 34 are driven mechanically however through multiple vee belts 46, 48 and pulleys 50, 52, 54 located on the engine, on a countershaft and on a torque transmission device in the form of a torque limiting clutch 56 (see FIG. 2) respectively.

Torque-limiting clutch 56 will now be described, with reference to FIGS. 2 and 3.

Figure 2:
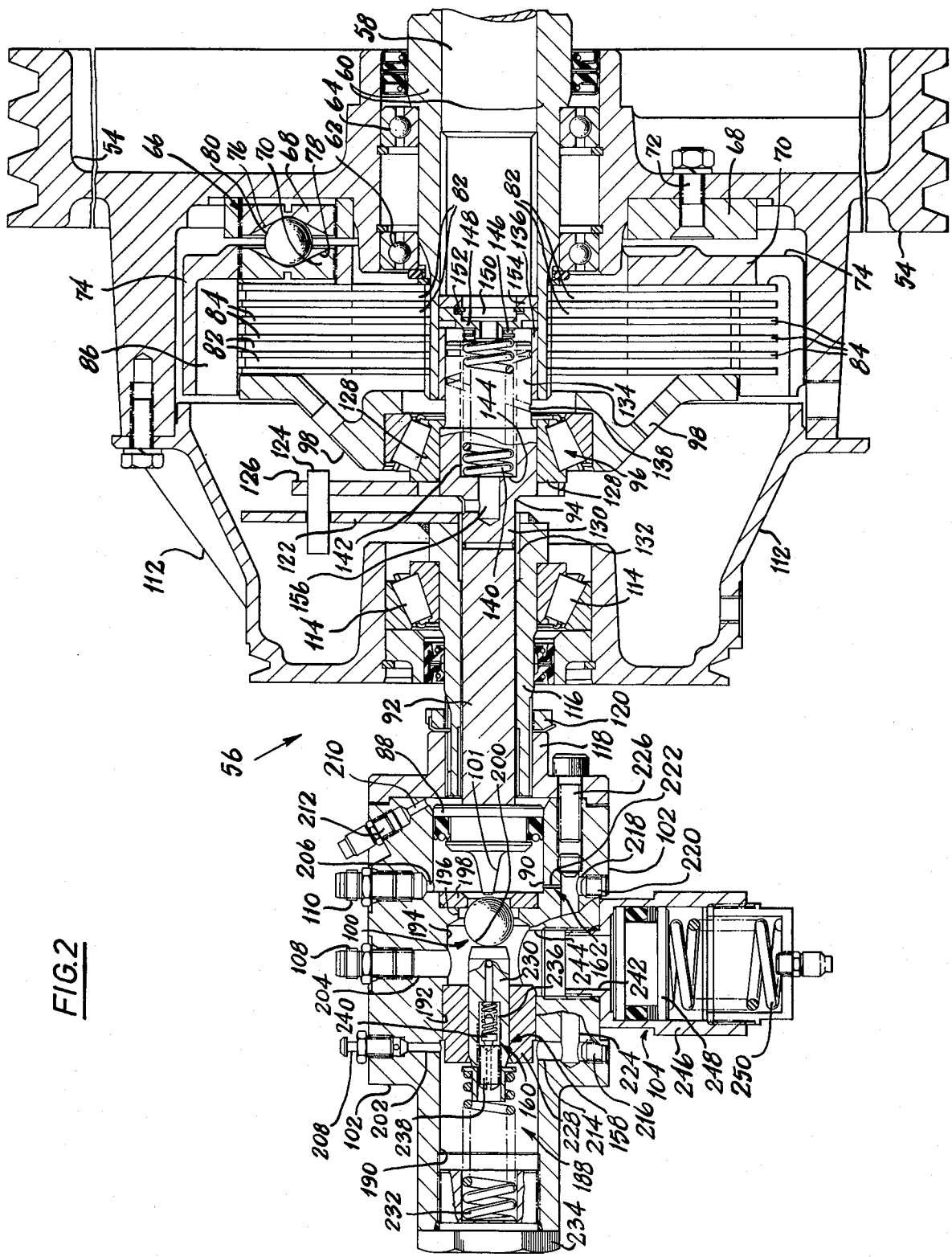
FIG. 2 shows a section on the line II—II in FIG. 1 through a torque limiting clutch forming part of the drive for the cane chopping elements.

As shown in FIG. 2, clutch 56 comprises:

a torque input member and flywheel constituted by multiple vee belt pulley 54;

a torque output member is in the form of a shaft 58 connected by a train of gears (not shown) to chopper drums 32, 34; pulley 54 is freely journalled through bearings 62, 64 on a drive sleeve 60 splined to the end of shaft 58;

a thrust generating self servo device 66 comprising a pair of annular ball-retaining members 68, 70 of which one, 68, is secured by bolts 72 to pulley 54, and the other carries an annular flange 74. The ball-retaining members 68, 70 are each formed with a series of equally circumferentially spaced complementary ramped recesses 76, 78 which confront one another in pairs, each pair having a ball 80 received therein;

a first series of five annular clutch friction elements 82 splined at their inner peripheries to sleeve 60;

a second series of annular clutch friction elements 84 interleaved with the friction elements 82 and drivably keyed at their outer peripheries to a series of axially extending dogs 86 welded to the inner surface of annular flange 74; and a piston 88 slidable within a cylinder 90, the piston being connected by first and second thrust transmitting rods 92, 94 and a taper roller thrust bearing 96 and a reaction ring 98, to the assembly of friction elements 82, 84.

Piston 88 and cylinder 90 constitute hydraulic fluid pressure generating means. This hydraulic fluid pressure generating means, in combination with fluid pressure responsive means in the form of a pressure relieving device comprising a ball type relief valve 100, constitute part of thrust responsive reaction means which responds to an increase in the thrust generated by self servo device 66 beyond a certain predetermined limit by disengaging the clutch. Piston 88 carries a projecting tapering abutment 101 to co-operate with valve 100 in a manner to be described.

Cylinder 90 is formed in a valve block 102 housing pressure relief valve 100 and which also houses an associated valve to be described below. Valve block 102 also provides a mounting for accumulator means in the form of a piston and coil spring type accumulator 104, and for hydraulic connectors 108 and 110 to receive hydraulic fluid pressure hoses (not shown). In addition, the valve block constitutes (for the purpose of defining the invention) structure defining a chamber (cylinder 90) for hydraulic fluid, in which a movable pressure member (piston 88) is mounted for movement whereby thrust can be transmitted between the pressure member and said structure so as to raise the pressure of fluid in the chamber.

Valve block 102 is supported by pulley 54 through a bell housing 112 rotatable with the pulley, a taper rolled bearing 114 and a support sleeve 116 secured inside the bearing. The valve block has an internally screw-threaded collar 118 which engages an external screw thread at the end of support sleeve 116 and is secured in position by a lock nut 120. First thrust rod 92 is freely slidable within support sleeve 116.

Non-rotatable components of clutch 56 include of course valve block 102 and sleeve 116 secured thereto. An arm 122 is provided at the inner end of support sleeve 116 and is connected by a pin 124 to a similar arm 126 mounted on the inner annulus 128 of thrust bearing 96 to prevent rotation thereof. Second thrust rod 94 has one end 130 slidingly received in a bearing sleeve 132 within support sleeve 116, while the other end 134 of rod 94 is received in a bearing sleeve 136 of phosphor-bronze or other bearing material secured within drive sleeve 60 (which rotates with output shaft 58).

Between its ends 130, 134, second thrust rod 94 has inner annulus 128 of bearing 96 secured thereto (as a press fit) for the transmission of thrust between the rod and the bearing.

A scroll-form lubricant return groove 138 is formed on the outer surface of end portion 134 of thrust rod 94. Within the rod, a compression type return spring 140 located in a bore 142 acts between the inner end 144 of the bore and a small race type thrust bearing 146. Bearing 146 is mounted on an internally screw-threaded spring-locating washer 148 within which is received a reduced diameter end portion 150 of shaft 58. A circlip 152 locates an annular retaining washer 154 on end portion 150, this washer serving to retain drive sleeve 60 on shaft 58.

Drillings forming a ventilation duct 156 connect bore 142 with the inside of bell housing 112 to prevent air pressure differentials therebetween inhibiting free axial sliding movement of push rod 94.

The structure which has been described so far operates (as will be described in detail later) to transmit torque from pulley 54 to output shaft 58. Furthermore, piston 88 is pushed leftwards (as seen in FIG. 2) by thrust rods 92, 94 to an extent proportional to the torque being transmitted by the clutch. Such movement generates a corresponding hydraulic pressure in cylinder 90, and a hydraulic circuit (shown in FIG. 3) is provided to sense and respond to this pressure and thereby to control the clutch. This circuit will now be described.

Figure 3:
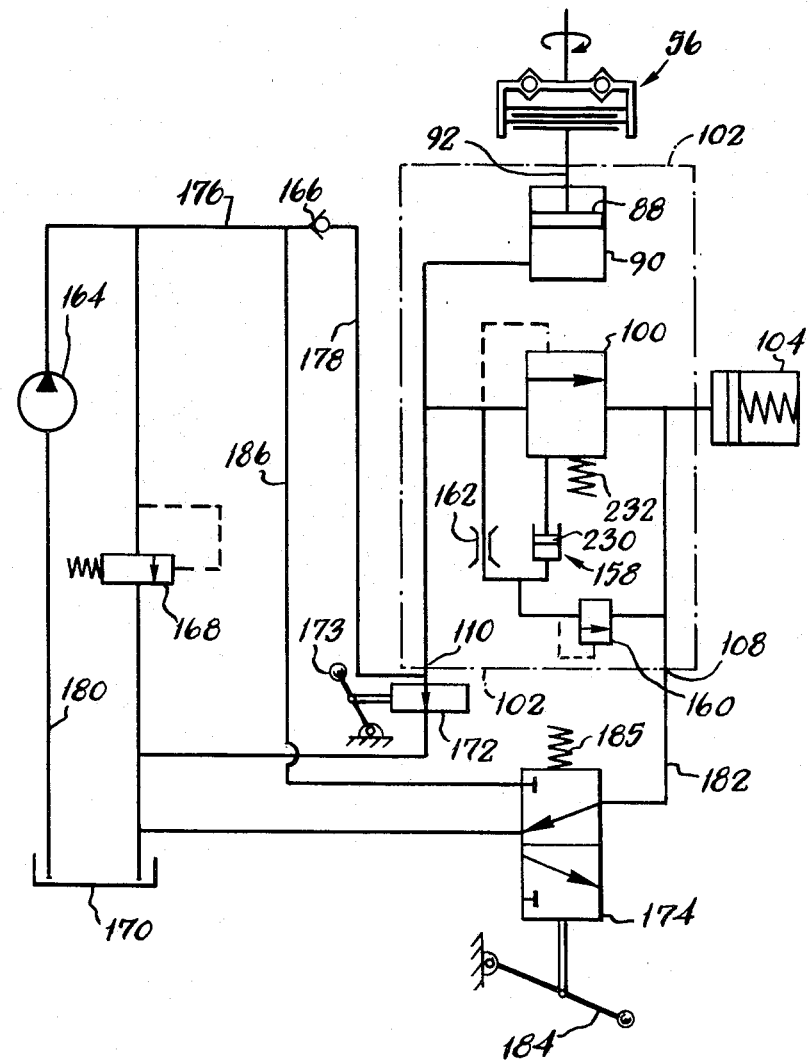
FIG. 3 is a hydraulic circuit diagram for the clutch of FIG. 2 and its associated control apparatus.

The principal items of the hydraulic circuit in addition to those already described are:

a piston and cylinder assembly 158 within valve block 102, constituting biasing means to bias relief valve 100 towards its closed condition, assembly 158 being connected through an orifice 162 also in the valve block, to cylinder 90;

a secondary or pilot pressure relief valve 160 within valve block 102; and a hydraulic pump 164, a non return valve 166, a main pressure limiting valve 168, a hydraulic fluid reservoir 170, a manually-operable on/off clutch disengage valve 172, and a manually-operable two way clutch engage valve 174 spring-biased to the condition shown in FIG. 3. The latter two valves are located within the driver's cab 175 of harvester 10.

As shown in FIG. 3, the pressure side of pump 164 is connected by pressure supply lines 176, 178 through non-return valve 166 to fluid connector 110 on valve block 102, while the suction side of the pump draws fluid through line 180 from reservoir 170. Pressure limiting valve 168 operates to pass fluid from pressure line 176 to reservoir 170 when the pressure in line 176 rises above a predetermined level. Clutch disengage valve 172 has a pivoted operating lever 173 and provides manually operable means for venting pressure supply line 178 to reservoir 170. Two way valve 174 operates normally to connect a fluid supply line 182 from fluid connector 108 on valve block 102, to reservoir 170. Manual operation of a lever 184 against a return spring 185 disconnects line 182 from the reservoir and connects it to a third pressure supply line 186 tapped into pressure line 176.

Pump 164, valves 166, 168, 172, 174 and reservoir 170 are individually of well known form and there is therefore no need to describe them further. However the structure and relationship of the hydraulic components within valve block 102 and accumulator 104 will now be described further.

Valve block 102 has formed therein two principal chambers arranged coaxially and end to end, those are: cylinder 90 (in which piston 88 is slidable) and a chamber 188 having three portions 190, 192, 194 of progressively decreasing diameter.

An annular shoulder 196 between chamber portion 194 and cylinder 90 supports a seat 198 for a ball valve member 200 of relief valve 100. The seat is bonded to the shoulder. Shoulder 196, seat 198 and ball 200 form the end wall of cylinder 90.

Drillings 202, 204, 206 in valve block 102 open into chamber portions 190, 194 and cylinder 90 respectively and communicate with a bleed nipple 208 and hydraulic connectors 108 and 110 respectively. A fourth drilling 210 communicates with a grease nipple 212, for lubrication of thrust rod 92 for sliding movement in support sleeve 116.

A fifth transverse drilling 214 closed by a plug 216 opens into chamber portion 190. A sixth transverse drilling 218 closed by a plug 220 terminates in a small bore portion 222 constituting restrictor or orifice 162, which opens into cylinder 90. A longitudinal drilling 224 closed by a plug 226 connects drilling 214 and 218 and thus provides fluid pressure communication between chamber portion 190 and cylinder 90, through orifice 222.

A thick sleeve 228 is bonded within chamber portion 192 in valve block 102 and has slidably mounted therein a rod-like compensating piston 230. A coiled compression spring 232 acts between the headside end of piston 230 and a plug 234 which closes chamber 188, so as to hold the rodside end of piston 230 in engagement with ball 200 of relief valve 100.

A longitudinal bore or passage 236 formed in piston 230 is screw threaded at the head end of the piston to receive a screw threaded longitudinally drilled valve seat 238 against which a valve member 240 is urged by a coiled compression spring. A smaller diameter continuation of bore 236 opens into chamber portion 194. Valve seat 238 and valve member 240 constitute pilot pressure relief valve 160 (see FIG. 3).

Accumulator 104 is formed with a relatively large diameter externally screw-threaded neck 242 which is received in a correspondingly large diameter passage or drilling 244 in valve block 102, which opens into chamber portion 194.

The accumulator 104 further comprises a cylinder 246 (constituting a vessel to receive hydraulic fluid) in which a piston 248 is slidable. Resilient means in the form of a spring 250 biases piston 248 towards the fluid-receiving end of the accumulator.

When sugar cane harvester 10 is in use, standing sugar cane is topped by topper 12, fallen sticks are raised by crop lifters 14. The cane sticks are severed from their roots by base cutters 16 and fed inwards butt end first by rollers 18 to 30 so as to pass between chopper drums 32, 34. The blades of the chopper drums co-operate to cut the cane sticks into billets about 30 centimeters in length.

The cane billets are carried upwards and rearwards successively by elevators 36 and 40 and trash is removed by trash removal apparatus 38 and 42 as the billets cascade from the upper end of each elevator.

As already described, drive is transmitted from the diesel engine to chopper drums 32, and 34 through belts 46 and 48 and clutch 56. Belt 48 is a triple vee belt and transmits drive to rotate pulley 54 of the clutch 56 whenever the diesel engine is running. Similarly, hydraulic pump 164 is also driven throughout the time that the engine is running, and pressurizes the hydraulic circuit.

The mode of operation of clutch 56 will now be considered, starting from its drive disengaged condition. In this condition, the clutch engage and disengage control valves 174 and 172 are in their primary positions, as shown in FIG. 3, and return spring 140 is holding friction elements 82, 84 in a disengaged condition with balls 80 in the bottom of their recesses 76, 78.

To engage clutch 56, with pump 164 running, and pulley 54 being driven, both valves 172 and 174 are simultaneously manually moved to their secondary positions in which valve 172 isolates hydraulic pressure line 178 and fluid connector 110 from reservoir 170, and valve 174 delivers fluid from pressure line 186 to fluid connector 108. Thus, referring to FIG. 2, both cylinder 90 and chamber portion 194 are pressurized, thereby seating ball 200 on its seat 198 and moving piston 88 to the right as seen in FIG. 2.

Movement of piston 88 to the right causes a corresponding axial thrust to be applied to friction elements 82, 84 through thrust rods 92, 94, bearing 96 and reaction ring 98.

Self servo device 66 and friction elements 84 are rotating with pulley 54. Friction elements 82 and output shaft 58 are stationary. The axial thrust applied to the assembly of friction elements by movement rightwards of piston 88 causes friction elements 82 to exert a drag on friction elements 84 and on their associated ball-retaining member 70, and this causes angular movement of member 70 relative to ball-retaining member 68. This results in balls 80 riding up their ramped recesses 76, 78 which generates a leftwardly-directed axial thrust on the friction elements which increases the drag they exert on each other which in turn increases the thrust generated by the self servo device 66. This is its self servo action. The position is rapidly reached, at which the torque transmitted between the rotating and non-rotating friction elements is sufficient to rotate output shaft 58 and the chopper drums 32, 34 (FIG. 1) connected thereto. The travel of balls 80 is limited so that they cannot come out of their recesses 76, 78.

When the loading of the cane chopper drums 32, 34 increases, the torque transmitted through self servo device 66 increases, thereby automatically increasing the thrust generated by the self servo device by the amount necessary for the extra torque.

The axial thrust generated by self servo device 66 is transmitted through the friction elements 82, 84, through reaction ring 98, through bearing 96 and through thrust rods 94, 92 to piston 88 thereby increasing the hydraulic pressure in cylinder 90. Since the axial thrust generated by the self servo device is proportional to the torque which it (and therefore the clutch 56) is transmitting, the fluid pressure in cylinder 90 is directly proportional to the torque transmitted by the clutch.

Non-return valve 166 permits the pressure in cylinder 90 to rise above the pressure in hydraulic line 176 (which is determined by pressure limiting valve 168). When the pressure rises to a level (about 3 times the pressure set by valve 168) corresponding to an overload condition in chopper drums 32, 34 (caused for example by excessive quantities of cane or by a rock), then relief valve 100 opens and fluid is rapidly dumped into accumulator 104, which disengages clutch 56 and the balls 80 of self servo device 66 re-centre themselves. The manner in which this occurs is as follows.

Immediately after clutch 56 has been engaged, return spring 185 on clutch engage valve 174 returns the valve to the condition shown in FIG. 3 in which chamber portion 194 in valve block 102, and accumulator 104 are connected to reservoir 170.

Pressure rises in cylinder 90 are communicated via orifice 162 and drillings 224 and 214 to chamber portion 190 and hence to compensating piston 230 and pilot valve 160.

The diameter of piston 230 is the same as that of the seat 198 for the ball 200 of relief valve 100, therefore since hydraulic pressure rises in cylinder 90 are communicated to chamber portion 190, piston 230 exerts on ball 200 a force exactly balancing that exerted on the ball by the fluid in cylinder 90. The ball is thus held on its seat by compression spring 232.

At a predetermined pressure, valve member 240 within piston 230 is lifted from its seat 238, and hydraulic fluid within chamber portion 190 is vented to accumulator 104 thereby reducing the thrust exerted on ball 200 by piston 230. Hydraulic fluid tends to flow from cylinder 90 through orifice 162 to chamber portion 190, but the orifice prevents a rapid equalisation of pressures and the pressure in cylinder 90 easily overcomes the thrust of compression spring 232 and lifts ball 200 from its seat.

Fluid in cylinder 90 begins to be vented to accumulator 104, piston 88 moves leftwards in its cylinder and abutment 101 on the piston mechanically unseats the ball 200 of valve 100 whereupon pressure in cylinder 90 drops to zero.

The leftward movement (as seen in FIG. 2) of piston 88 releases the clamping forces on friction elements 82, 84 thereby interrupting the transmission of torque to friction elements 82 (which are splined to drive sleeve 60) and permitting friction elements 84 to rotate freely with pulley 54. Annular flange 74 engages bell housing 112 and no further torque reaction by self servo device 66 is possible.

Return spring 140 in thrust rod 94 exerts a larger force (through thrust rod 92 and abutment 101) on ball 200 than compression spring 232 in valve block 102 does. Therefore ball 200 is held off its seat by abutment 101, while the output of pump 164 is discharged to reservoir 170 through fluid connector 108 and clutch engage valve 174. Accumulator 104 also discharges to reservoir 170.

To re-seat ball 100 and re-engage clutch 56 it is necessary to operate the clutch engage valve 174 so as to pressurize both chamber portion 194 and cylinder 90, as described previously.

Manual disengagement of clutch 56 by means of disengage valve 172, vents cylinder 90, allowing leftward movement of piston 88 and releasing the friction elements 82, 84 as described above. It is only necessary to vent cylinder 90 for about half a second, after which abutment 101 holds valve 100 open. Valve 172 can then be returned to its shut position ready for re-engagement of the clutch.

During use, any leakage at relief valve 100 or at the manual control valves 172, 174 or past compensating piston 230, which results in the pressure in cylinder 90 dropping below the pressure in hydraulic line 176 from pump 164 is made up by recharging of the cylinder between successive chopping actions of chopper drums 32, 34.

It will be appreciated that a torque limiting device which is to provide protection for the cane chopping mechanism and its drive in a sugar cane harvester must be able to operate very rapidly. When a rock enters the chopping mechanism, the time interval between the torque in the chopper drive commencing to rise above normal and the production of serious damage is extremely short.

An embodiment of clutch 56 described above has been made and operates to interrupt drive to the choppers in 3 milliseconds. Of this time, 2 milliseconds are occupied in raising the pressure in cylinder 90 to its limiting valve. Therefore the time taken for the flow of fluid out of cylinder 90 is extremely short which makes for a very high instantaneous rate of flow (for example a flow in the region of 450 litres per minute). It is for this reason that accumulator 104 is mounted directly on valve block 102 with a large diameter passage connecting the two. If standard hydraulic hoses were used to pass such a flow, an undesirable pressure rise would occur which would inhibit proper release of torque.

Other factors contributing to effective operation of clutch 56 are the provision of compensating piston 230 and of pilot pressure relief valve 160. Since the diameter of piston 230 is the same as that of the seat for ball 200 of relief valve 100, the piston compensates at all pressures for the thrust exerted on the ball by fluid pressure in cylinder 90. Therefore effective sealing between ball 200 and seat 198 is assured by compression spring 232 at all pressures. Furthermore pilot valve 160 allows valve 100 to open rapidly and completely.

Thus clutch 56 automatically interrupts the drive to choppers 32, 34 under overload conditions, thereby avoiding or minimizing damage to the chopper drums and their drive mechanism. After a rewind motor has been used if necessary, the drive to the choppers is quickly and easily re-engaged without the need for the harvester operator to leave his control position. Thus delays are minimized. Furthermore, clutch 56 provides for manual control of the drive therethrough, which many torque limiting devices do not.

Among modifications which could be made in the above embodiment and which fall within the scope of the invention are:

1. the use of alternative forms of self servo device such as mutually engaging ramps. The term "self servo device" as used in this specification is intended to cover any such device capable of generating a clutch-engaging force from torque transmitted through the clutch;

2. the thrust responsive reaction means of the clutch which is constituted, in part, by piston 88 and cylinder 90 could be located elsewhere in the clutch. For example it could be placed adjacent the self servo device so as to transmit thrust therefrom directly to the clutch elements;

3. piston and cylinder assembly 88, 90 could be replaced by hydraulic or mechanical equivalents. An example of a mechanical equivalent is an assembly of Belleville washers to release the clutch on overload, together with a mechanical clutch-engaging linkage; and 4. use of a single hydraulic control valve in place of valves 172, 174.

I claim:

1. A torque transmission device comprising:
   a torque input member;
   clutch elements;
   a thrust generating self servo device; and
   a torque output member;
   the clutch elements and the self servo device being connected between the torque input and torque output members, whereby torque can be transmitted from the torque input member through the self servo device and the clutch elements to the torque output member
   characterized by
   thrust responsive reaction means connected to the self servo device and responsive to a rise in thrust generated thereby above a predetermined level comprising
   hydraulic fluid pressure generating means and fluid pressure responsive means connected thereto, the fluid pressure generating means having structure defining a chamber for hydraulic fluid and a movable pressure member mounted for movement within the chamber whereby thrust can be transmitted between the pressure member and said structure through fluid in the chamber, thereby raising the pressure of said fluid,
   a pressure-relieving device, and
   a vessel to receive hydraulic fluid, a passage between said vessel and said chamber containing the movable pressure member, and a pressure relief valve in said passage to control the flow of fluid from said chamber to said vessel, said pressure relief valve comprises a valve member and a valve seat, the valve seat being provided by a wall of said chamber.

2. A device according to claim 1 characterized in that said movable pressure member carries an abutment engageable with said valve member after the valve member has been unseated by hydraulic pressure, to move the valve member further from its seat.

3. A device according to claim 1 characterized by biasing means to bias the valve member towards its seat, the biasing means comprising a piston and cylinder assembly, the piston of said assembly being engageable with the valve member, and the cylinder of said assembly being in fluid pressure communication with said chamber containing the movable pressure member.

4. A device according to claim 3 characterized by a passage between the headside and rodside chambers of said piston and cylinder assembly and a pressure relief valve located in said passage.

5. A device according to claim 4 characterized in that said passage between said headside and rodside chambers is formed in said piston.

6. A device according to claim 1 characterized in that said vessel to receive hydraulic fluid comprises accumulator means including a piston or diaphragm mounted in said vessel and resilient means biasing the piston or diaphragm towards the fluid receiving end of the vessel.

7. A device according to claim 6 characterized in that said accumulator means is mounted on the structure defining said chamber and opens directly into a passage formed in said structure.

8. A device according to claim 1 characterized by a hydraulic pump, a non return valve, and a hydraulic fluid reservoir, the suction side of the pump and outlet side of the pressure relief valve being connected to the reservoir, while the pressure side of the pump is connected through said non return valve to said chamber containing the movable pressure member.

9. A torque transmission device comprising:
a torque input member;
clutch elements;
a thrust-generating self servo device; and
a torque output member;
the clutch elements and the self servo device being connected between the torque input and torque output members whereby torque can be transmitted from the torque input member through the self servo device and the clutch elements to the torque output member;
characterized by
a piston and cylinder assembly;
a thrust transmitting member connected between said clutch elements or said self servo device and the piston of said piston and cylinder assembly; and
a hydraulic pump, a hydraulic fluid reservoir, a non return valve and a pressure relief valve;
the suction side of the hydraulic pump and the outlet side of the pressure relief valve being connected to the hydraulic fluid reservoir while the pressure side of the pump is connected to the headside chamber of said piston and cylinder assembly through said non-return valve and the inlet side of the pressure relief valve is also connected to said headside chamber.

* * * * *